Jan. 29, 1957 G. JENDRASSIK 2,779,530
END PLATE STRUCTURES AND MACHINES EQUIPPED THEREWITH
Filed Dec. 1, 1952 6 Sheets-Sheet 1
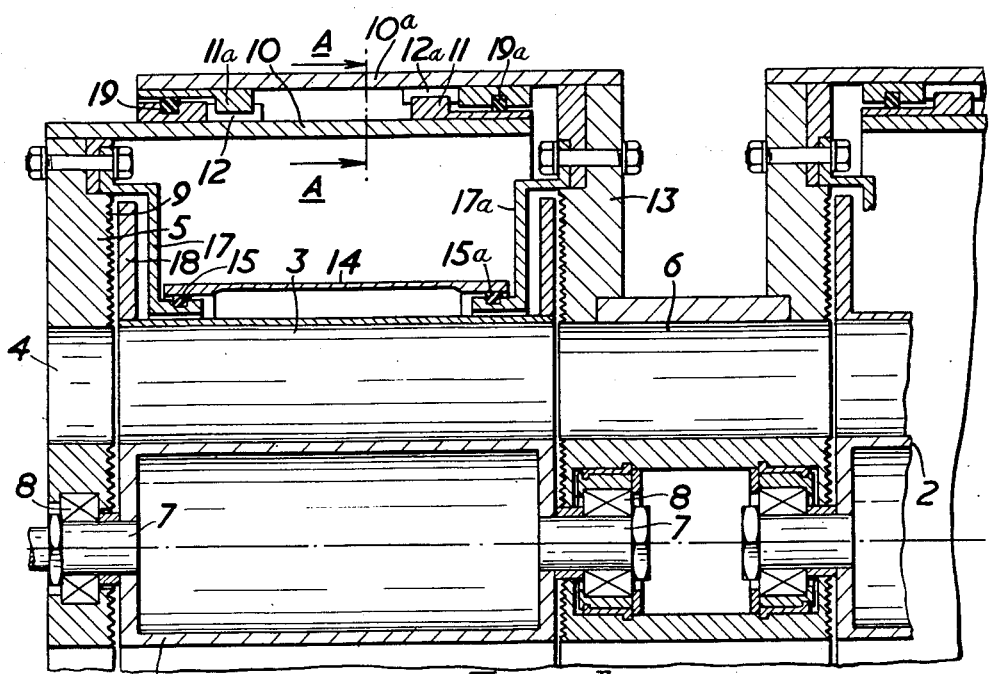
Inventor
George Jendrassik
By Stevens, Davis, Miller & Mosher
Attorneys Jan. 29, 1957  G. JENDRASSIK  2,779,530
END PLATE STRUCTURES AND MACHINES EQUIPPED THEREWITH
Filed Dec. 1, 1952  6 Sheets-Sheet 3

Inventor
George Jendrassik

By Stevens, Davis, Miller & Mosher
Attorneys

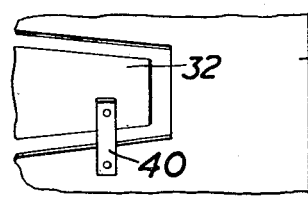
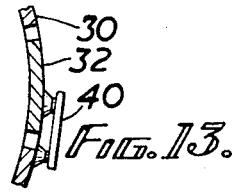
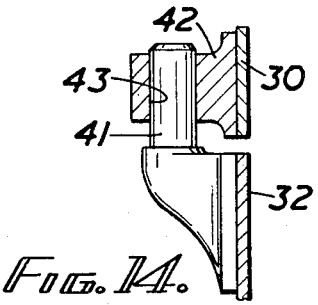
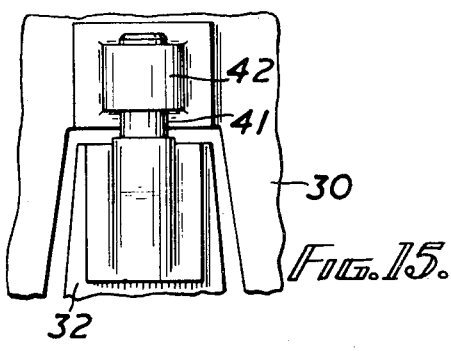
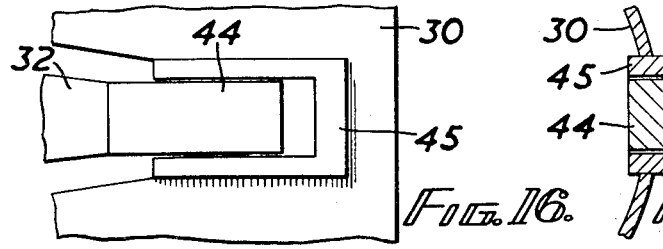
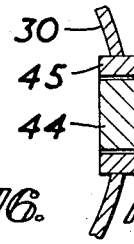
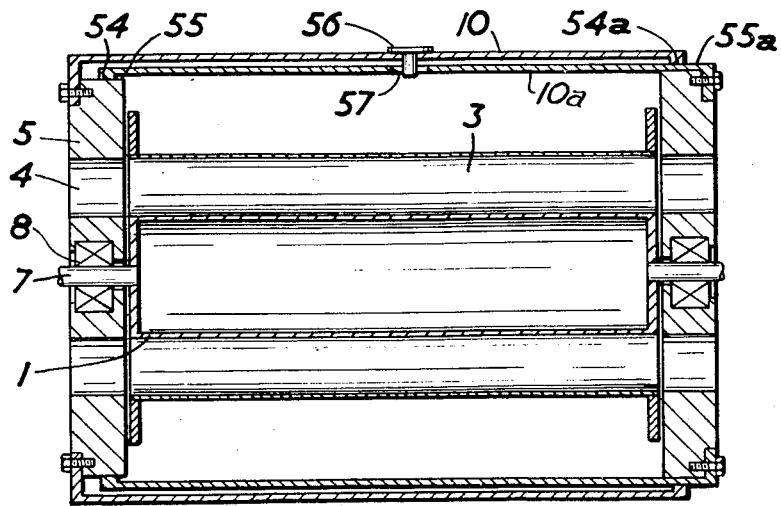

United States Patent Office 2,779,530
Patented Jan. 29, 1957

2,779,530

END PLATE STRUCTURES AND MACHINES EQUIPPED THEREWITH

George Jendrassik, London, England; Andre G. T. Boszormenyi and Clara Jendrassik, executors of said George Jendrassik, deceased, assignors, by mesne assignments, to Jendrassik Developments Limited, London, England Application December 1, 1952, Serial No. 323,490

Claims priority, application Great Britain December 13, 1951

8 Claims. (Cl. 230—69)

This invention relates to an end plate structure required to be maintained in close engagement with a machine component with relative rotation between them despite alterations in dimension along the rotational axis of that component.

The problem of providing such an end plate structure arises in the construction of pressure exchangers. It is expected that the main field of application of this invention is to such apparatus but it also appears likely that other applications are possible, for instance to rotary regenerative heat exchangers.

With pressure exchangers the cell rings are, in operation, subjected to high temperature and high pressure gas flows. They are therefore given to substantial thermal expansion and the maintenance of gas-tight seals between moving and stationary parts under these circumstances is difficult. In the normal case the cell ring rotates on shafting between end plates and it is the axial expansion of the cell ring that causes particular difficulty. To ensure the maintenance of running clearances it has been previously proposed that at least one of the end plates should move axially with the cell ring during thermal growth of the latter. It has also been previously proposed to seal such clearances by labyrinth or other glands. Because of unequal forces developed across the face of such an end plate and other effects e. g. vibration, arrangements had to be made to counteract its tilting tendencies. It is considered that the present invention provides improvements over previously suggested arrangements in this respect. Regenerative heat exchangers with rotary matrices constructed up to the present have employed rigid end plate structures and sealing has commonly been by rubbing seals. Should rotational speeds be increased appreciably above those now attained rubbing seals will be no longer satisfactory and because of this, and other reasons, heat exchanger embodiments of the present invention can be foreseen.

The invention provides an end plate structure required to be maintained in close engagement with a machine component with relative rotation between them despite alterations in dimension along the rotational axis of said component which structure is arranged to be displaced axially a distance substantially equal to any axial displacement of such part of said component which is adjacent to said structure and which structure comprises an end plate, an axial extension of the end plate radially beyond said machine component, a guiding system for the end plate permitting the latter to be axially displaced and effective in at least two planes perpendicular to the rotational axis, and guiding devices forming part of said guiding system, being effective in at least one of said planes and being arranged on said extension so as to counteract tilting tendencies of the end plate.

At the far side of the machine component from the end plate structure set forth there may be either another end plate carrying at least part of the guiding system or for example, an end plate which is attached to the fixed supporting structure, baseplate or casing of the machine. In either case each end plate may have an axial extension carrying the guiding system for the other end plate. On the other hand end plates with their guiding system carried by an independent part e. g. a casing of the machine are possible. The axial extension of an end plate may be of skirt form extending from an end plate, e. g. cylindrically or alternatively there may be a plurality of peripherally spaced members together forming said extension. Skirt members from two end plates may be slidably engaged telescopically one within the other. Another arrangement is that members from the two end plates may be interdigitally meshed. The guiding devices may conveniently take the form of tongue and groove members, keys and keyways or other simple co-operating arrangements which permit relative axial movement, prevent tilting and take into account any radial expansion of the machine component and end plate structure. Means, e. g. a lever linkage system, may be incorporated which counteract unbalanced forces on the end plates, say by forces provided from a piston in a cylinder connected to a supply of fluid under pressure. Where the embodiment is a pressure exchanger the fluid may be gas from the pressure exchanger cycle. Not only are pressure exchanger embodiments with single cell rings foreseen but also for example those with two cell rings in tandem. In that case there may be four axially-spaced end plates altogether or one central "end plate" may serve both cell rings. In addition to the close sealing engagement between cell ring and adjacent end plate further sealing means around the cell ring or on the inside thereof may be provided, which sealing means also allows for axial displacement. The guiding devices conveniently consist of two co-operating groups of components, one of which is arranged on an end plate or its extension which is to be guided and the other of which is arranged on some other structure. If this other structure happens to be another end plate or its extension, then the two end plates are guided relatively to each other thus keeping good alignment.

The invention also provides a machine arranged for the flow therethrough of hot gas which comprises a component in which energy is subtracted from said hot gas, end plates which are relatively rotatable with said component, which are arranged to conduct gas to and from said component, which are situated on axially separated sides of said component and which are mounted so as to permit axial displacement necessitated by axial change of dimension of said component, and in which the position of one end plate relative to the rotational axis is determined by the other.

The invention will now be described with reference to a number of embodiments thereof shown in the accompanying drawings in which:

Figure 1 is a part longitudinal section through one half of a pressure exchanger having two contra-rotating cell rings in tandem and having end plate structures in accordance with the invention.

Figure 2 is a portion of a section on the line A—A of Figure 1 showing the guiding system for one of the end plates.

Figures 8-17 taken in pairs show five different co-operating arrangements of guiding system and end plate extension device.

Figure 18:
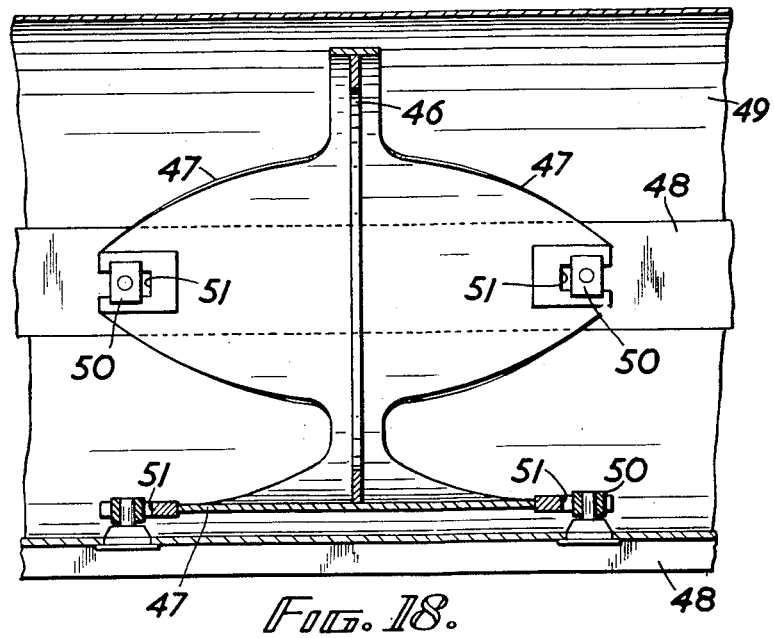
Figure 19:
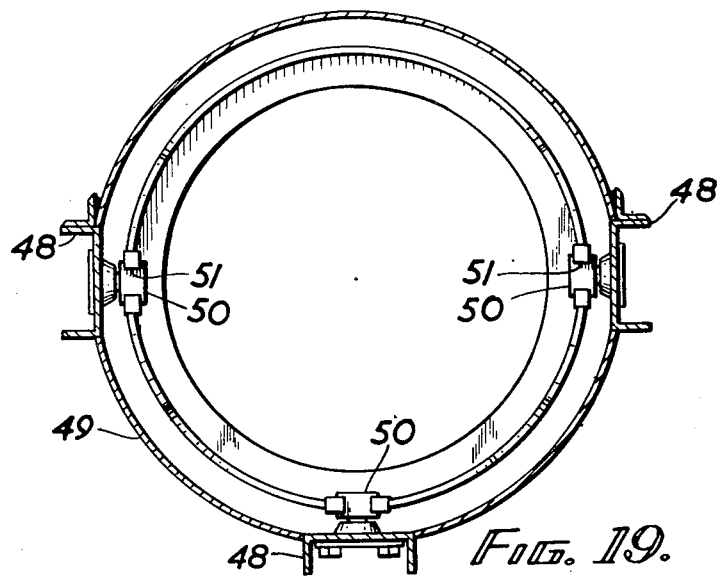

Figures 18 and 19 show sectioned side and end views respectively of an end plate extension arrangement extending axially in both directions and supported by a guiding system carried by a rigid supporting structure.

Figure 20:
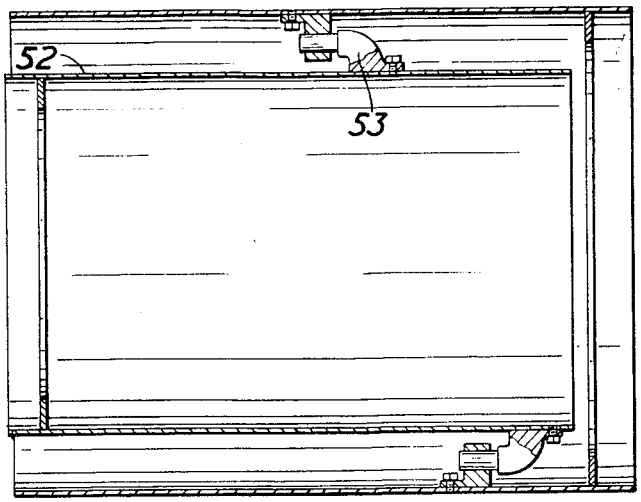
Figure 21:
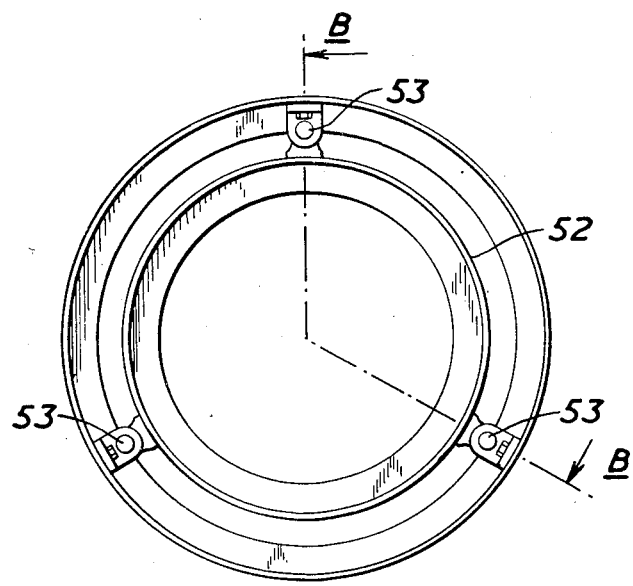

Figures 20 and 21 show diagrammatically an end plate structure with three devices upon its axial extension for co-operating with the guiding system. Figure 20 is a section along line B—B of Figure 21.

Figure 22 shows diagrammatically a further pressure exchanger embodiment of the invention.

In Figure 1 there will be seen the application of the invention to a pressure exchanger of known type having two contra-rotating cell rings 1 and 2 arranged in tandem. One of the cells is shown at 3 and it is shown in scavenging alignment with a cell of the other end ring, gas flow passing in through the orifice 4 in the end plate 5, via the cell 3 itself and the transfer passage 6 into and through the cell in the other ring 2. The cell ring 1 is mounted on stub shafts 7 running in bearings 8 housed in the appropriate end plates, such as 5. The bearings 8 are arranged so as to define the axial location of the end plate relative to the stub shaft, i. e. the bearings are capable of taking axial thrust forces in either direction. Thus, as has been previously suggested elsewhere the cell ring on expanding during operation is free to displace the stub shafts axially and the associated end plate is moved a substantially equal distance in the same direction as the axial movement of the stub shaft. In this way the close engagement of the cell ring with an adjacent end plate is substantially ensured. It will be seen that gas leakage losses between cells and out of the cell ring are dependent upon labyrinth seals such as 9 so that the importance of this close engagement will be appreciated. Owing to the unequal forces acting in different circumferential parts of the cell ring tendencies for the end plate to tilt are present and these have to be resisted or the labyrinth seal might seize. This seal may be arranged on a cylindrical or conical surface but the same problems of tilting and displacement remain. In the embodiment shown the seal between the cells and end plate is provided on faces perpendicular to the rotational axis. If the radially outer seal (e. g. a labyrinth) is arranged cylindrically around the cells then the co-operating face may be on the axial extension of the end plate, or a different extension from those involved in the prevention of tilting.

The precautions taken against tilting require the provision of a guiding system allowing an end plate to move in an axial direction only. To this end the end plate has an axial extension 10 radially beyond the cell ring which needs to be guided at least at three circumferentially spaced positions. One of these positions at least needs to be in a different plane from the remainder with respect to a plane perpendicular to the axis. In this instance more than three guiding positions are used. Two of them are visible in Figure 1 and they consist of splines or keys 11 and 11a running in keyways 12 and 12a arranged at axially separated stations. It will be seen that these keyways and splines do not prevent axial displacement of the end plate 5. The end plate 13 is conveniently supported from outside the pressure exchanger and it likewise has an axial extension 10a. The latter extension carries the splines 11a and keyways 12a and they co-operate with the keyways 12 and splines 11 respectively carried by the extension 10 to give a guiding effect to the end plate 5 and its extension. It will be appreciated that it is the circumferential spacing of these co-operating arrangements that positively prevents the end plate extension 10 moving in any other direction than the axial direction. Of these splines or keys and keyways there can be a great number employed. However three of each in a plane is an acceptable figure. It will be seen in Figure 2 that the guiding system in this case comprises a number of these circumferentially spaced splines and keyways or other similar arrangements. It will be noted that the guiding system allows for some radial expansion of the end plates whether equal or differential.

If the pressure exchanger were tightly sealed within an external casing then as a result of gas leakage a pressure much greater than atmospheric would be built up within the casing. The casing would then have to be robust and correspondingly heavy. This undesired requirement can be avoided by sealing the spaces immediately around the cell ring. Moreover, this sealing is preferably arranged on the smallest possible diameter so that unbalanced forces on the end plate can be reduced. Such a sealing arrangement is shown in Figure 1 where the open-ended cylinder 14 surrounds the cell ring and is sealed at 15 and 15a, e. g. by piston rings, from the flanged discs 17 and 17a attached to the end plates. The cylinder 14 is either split or it may be slipped on over the cell ring providing the sealing flange 18 is made removable. It will be noticed that further sealing from the outside is shown at 19 and 19a. This is a refinement which it is considered will not be normally necessary. On the other hand, in some circumstances it may be preferred to retain the sealing arrangement 19, 19a and to dispense with the sealing cylinder 14.

The end plate arrangement is repeated for the second cell ring which is only partly shown.

Figure 3:
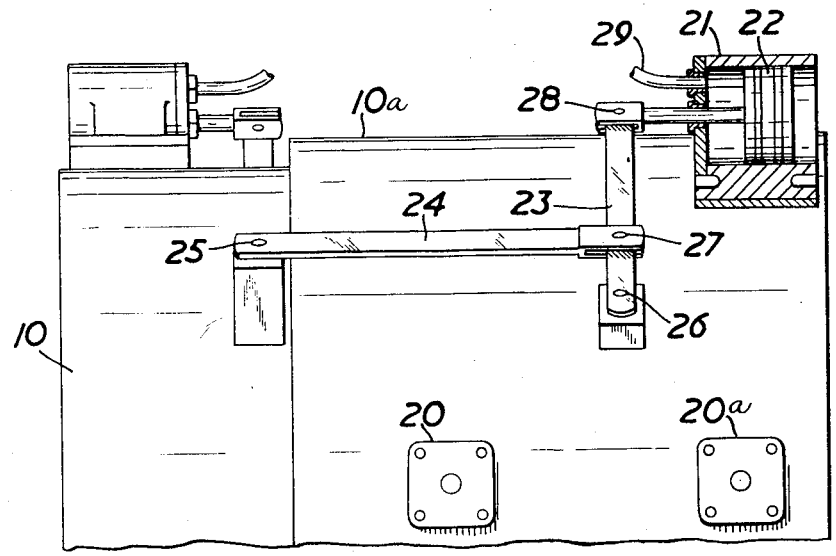
Figure 3 is an external view of a pressure exchanger as shown in Figure 1 with the addition of a lever linkage system for counteracting unbalanced forces.

Figure 3 may be considered as an external view of a single cell ring pressure exchanger a section view of which would be very similar to the lefthand end of Figure 1. As the end plate axial extensions 10 and 10a are mutually supporting it is not necessary for both of them to be directly associated with a supporting structure. Attachment plates 20 and 20a are therefore mounted on one only of the extensions, namely the radially outer one 10a.

Figure 4:
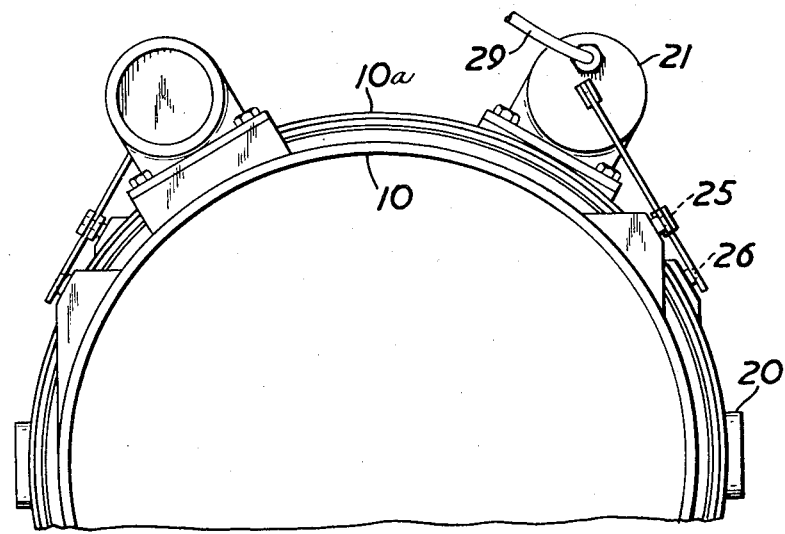
Figure 4 is an end view of the arrangement shown in Figure 3.

A pressure balancing system for counteracting out of balance forces on the end plates is shown in both the external view (Figure 3) and the end view (Figure 4) of this pressure exchanger. It will be appreciated that the pressure balancing system is independent of any external structure and it is effective on the end plates or their extensions only. In this case there is a linkage system which is actuated by pistons running in cylinders, one of which 21 is shown in section. A suitable pressure is built up behind the piston 22 to exert the required force tending to pull the end plate extensions 10 and 10a towards one another or in general to balance the free forces acting. The two levers 23 and 24 are pivoted on the end plate extensions at 25 and 26 and to one another at 27. The link 23 is pivoted to the piston rod at 28. The pressure in the cylinder may be built up by connection via a pipe 29 to an appropriate point in the pressure exchanger system. Two pressure balancing cylinders are shown in Figures 3 and 4 but the actual number required and the placing of the lever linkage systems is a matter to be individually determined with respect to any particular pressure exchanger or other embodiment of the invention. In the case of a pressure exchanger having two cell wheels in tandem with an intermediate structure between them embodying two inner end plates for the two cell wheels (as in Figure 1) it may be sufficient to balance the forces acting on the outer end plates by connecting them to each other by the linkage system on which the pistons are acting. The pressure cylinders may also be fixed to these outer end plates. If desired of course it is possible to engage the intermediate structure in the force balancing mechanism.

In view of the smallness of the end plate displacements relative to one another, the piston and cylinder arrangement may be replaced by a diaphragm mechanism.

Figure 5:
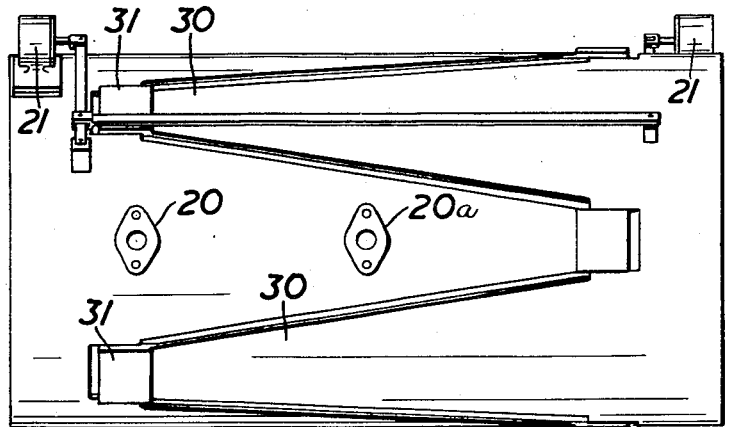
Figure 5 is an external view of a pressure exchanger having an end plate structure according to another embodiment of the invention whilst
Figure 6:
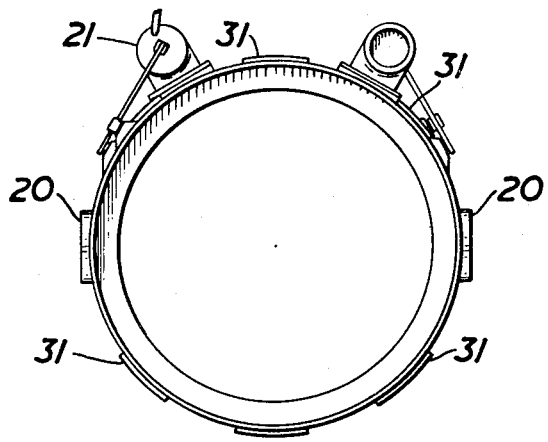
Figure 6 is an end view of this pressure exchanger.
Figure 7:
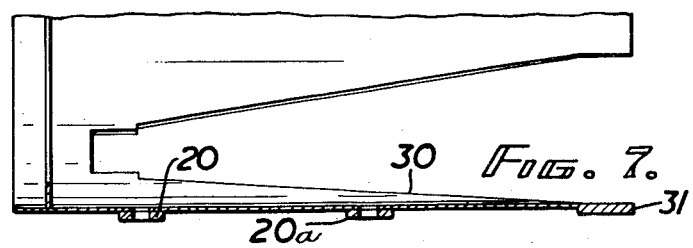
Figure 7 is a half section showing in more detail the construction of one of the end plate extensions in this case.

In both of the arrangements so far described the axial extensions of the end plates have been of skirt form and cylindrical although clearly they could have been of other suitable polygonal shape, e. g. hexagonal. In the arrangement shown in Figures 5 to 7 the axial extensions of the end plates are made up of separate circumferentially spaced members such as 30. Both end plate extensions are shown to be of geometrically similar form and they may be considered as two "crowns" with the axially extending members 30 of the two inter-digitally meshed. At the end of each crown member remote from the associated end plate there is a device for co-operating with the guiding system carried on the other crown. These devices are shown diagrammatically at 31 and it will be seen that in this instance there are, in all, eight guiding points in two planes normal to the axis. A pressure balancing lever linkage system as shown in the previous embodiment is applied to this double crown end plate structure also.

Some of the possible co-operating arrangements for the guiding system are shown in Figures 8 to 17.

The first arrangements are shown in the side and end scrap sections (Figures 8 and 9). The apex of a crown extension 30 is shown at 32 and this is slotted at 33. On the base of the opposite crown 30 there is mounted a bridge piece 34 supporting a pin 35 between it and the crown. A grooved bush 36 is mounted on the pin and this is slidable in the slot 33. Hence, the apex of the crown 32 is able to move axially with respect to the pin 35 whilst there is resistance against tilting because of the engagement of the bush 36, the slot 33 and the pin 35. A refinement is incorporated in this arrangement in that the pin 35 is made eccentric as shown at 37. This enables the alignment of the end plate to the cell ring to be somewhat adjusted on assembly. The bush 36 arranged on the pin 35 preferably has a rectangular shape. The sides then provide a good bearing surface against the sides of the slot in which the bush has to work.

Another arrangement is shown in Figures 10 and 11 and instead of having a slot in the apex 32 of the crown, a slot 38 is provided in the base of the opposing crown 30. A pin 39 is in this case mounted upon the apex and the grooved bush 36a is provided as before but in this case a circular bush is indicated. In this instance also the pin 39 may be made eccentric and adjustable for the same reason.

A very simple arrangement is shown in Figures 12 and 13 where the crown apex 32 is guided by being joined by a pivoted link 40 to the opposing crown base 30. Because such links must of necessity be fairly short the displacement allowed by them is not truly axial but the deviation may be sufficiently small to be negligible.

The arrangement shown in Figures 14 and 15 is one in which the crown apex carries an axially extending pin 41. The opposite crown base 30 supports a member 42 providing a bore 43 into which the pin 41 is a sliding fit. It is clear that this provides for an axial displacement and counteracts tilting.

In Figures 16 and 17 the crown apex 32 has a machined rectangular sliding end piece 44 and the opposite crown base 30 carries a machined longitudinal guide slot 45.

An axially displaceable end plate extension construction different from those described above is shown in Figures 18 and 19. In this arrangemeent the end plate extension comprises a ring 46 for attachment to the end plate proper (not shown) and members 47 extending in both axial directions. A supporting structure 48 carries a casing 49 for the whole machine. The guiding system is also carried by the structure 48 and takes the form of bushed pins 50 co-operating with slots 51 on the ends of the extensions 47. It will be appreciated that this is an instance where two end plate extensions are not mutually supportable and it is conceivable that another end plate of the same machine may be supported in like manner on the structure 48 or alternatively that an end plate might be fixed to the supporting structure.

In the embodiments of the invention so far described the guiding system has been effective on two planes normal to the axis of displacement. It has been previously mentioned however that the basic requirement for the co-operating guiding arrangements is that there should be at least three positions where the end plate extension is so guided and in Figures 20 and 21 there is shown diagrammatically (with Figure 20 a section on the line B—B on Figure 21) a cylindrical end plate extension 52 arranged to slide within either a slightly larger cylindrical end plate extension carried by an opposing end plate, that is as shown, or alternatively it might be axially displaceable within a guiding system carried on an independent supporting structure. The devices mounted on the extension itself for guiding co-operation with the external system are shown disproportionally in a form 53 similar to that already described in connection with Figures 14 and 15. These are circumferentially spaced around the end plate extension and it will be clear that whilst each of them permits axial displacement the three together prevent the end plate extension 52 and therefore the end plate to which it is attached from being tilted.

In Figure 22 is shown a section through a single cell ring pressure exchanger having a different kind of co-operating arrangement embodied from those previously discussed. It may be considered specially in relation to the embodiment illustrated in Figures 1 and 2 and the same reference numerals have been used where appropriate. Again one end plate axial extension 10 slides within the other but the guiding arrangements consist of faced flange pieces 54 and 54a co-operating with true cylindrical surfaces 55 and 55a. The guiding system for the inner extension 10 consists of the surface 55 on the end plate 5 and the flange 54a carried by the extension from the same end plate. The co-operating devices on the same inner end plate extension are its flange 54 and its surface 55a. The co-operating arrangements at either end of the equipment can clearly then be considered as a guiding system co-operating with an infinite number of circumferentially spaced devices. In the embodiment there may be need also for means for preventing relative rotation of the end plates one to the other. A pin 56 is shown attached to the outer end plate extension and free to move axially within a slot 57 in the inner end plate extension.

Some of the guiding devices which may be made use of in embodiments of the invention are such as to prevent radial displacement in one plane perpendicular to the axis of rotation even if devices effective in other such planes are not considered. In other cases radial displacement may be prevented only by the combined action of devices in two of such planes. In order to counteract tilting tendencies of an end plate however a guiding system effective in two planes perpendicular to the rotational axis is necessary.

Whilst the different embodiments of the invention have been described with particular references to pressure exchangers, and in fact Figure 1 shows such apparatus detailed, it will be clear that all the embodiments of the invention are equally applicable to other equipment where end plate structures are required to be kept in close engagement with another machine component where there is relative rotation between them. For example, Figures 3 and 5 might equally well be external views of rotary regenerative heat exchangers incorporating small clearance seals rather than rubbing seals. It is also possible to imagine a gas turbine or a compressor or a gas turbine plant enclosed between two end plates which would need to be axially displaceable.

In the embodiments described above relative rotation between end plate and machine component is due to rotation of the latter. That is not necessarily always the cause, for example both pressure and regenerative heat exchangers have been described in which it is the end plates which are rotated. The invention is applicable to such embodiments.

What I claim is:

1. In a fluid energy-conversion machine having a ported end plate and an axially-adjacent structure which are relatively rotatable and which are required in operation to be maintained in close axial engagement, a locating arrangement comprising bearing means mounted in one and a shaft carried by the other of said end plate and said structure, said shaft received in said bearing means and being located therein to maintain substantially constant the axial clearance between said end plate and said structure, and a guiding system comprising axially extending means attached to said end plate positioned radially beyond said structure, support means fixed stationary relative to said axially extending means, said axially extending means and said support means defining mutually coacting means functioning to maintain said axially extending means and said support means in sliding engagement at at least three circumferentially spaced points and in at least two axially spaced planes to permit axial movement of said end plate and said axially extending means but preventing tilting thereof 2. In a fluid energy-conversion machine as defined in claim 1 wherein said support means includes a second end plate on the axially remote side of said structure from said first-mentioned end plate and second axially extending means attached to said second end plate positioned radially beyond said structure and slidably interengaging with said first-mentioned axially extending means.

3. In a fluid energy-conversion machine as defined in claim 2 wherein each said axially extending means includes a plurality of axially directed projections with the projections of one positioned to mesh interdigitally with the other.

4. In a fluid energy-conversion machine as defined in claim 2 further including gas-sealing means interposed between said first mentioned and said second axially extending means.

5. In a fluid energy-conversion machine as defined in claim 2 wherein both said axially extending means have inwardly directed flanges at their extremities the inner edges of which constitute sliding surfaces.

6. In a fluid energy-conversion machine as defined in claim 1 further including means mounted on said support for counter-acting circumferential pressure unbalance on said end plate.

7. In a fluid energy-conversion machine as defined in claim 6 wherein said means for counter-acting circumferential pressure unbalance includes a cylinder mounted on said support means, a piston slidably received within said cylinder and a lever linkage connected to said piston and said end plate.

8. In a fluid energy-conversion machine as defined in claim 1 further including a cylindrical member positioned around said structure radially spaced inwardly from said axially extending means and an annular element attached to said end plate in gas-sealing engagement with said cylindrical member.

References Cited in the file of this patent

UNITED STATES PATENTS 1,682,317    Allen _____ Aug. 28, 1928

FOREIGN PATENTS 570,934    Germany _____ Feb. 25, 1933
600,025    Great Britain _____ Mar. 30, 1948
891,656    France _____ Dec. 11, 1943